Aug. 28, 1951     G. P. ICKES ET AL     2,565,852
THREADED FASTENER
Filed Aug. 24, 1950

INVENTORS
GILBERT P. ICKES
CALVIN D. MILLER
BY Haugood & VanHorn
Their ATTORNEYS.

Patented Aug. 28, 1951

2,565,852

UNITED STATES PATENT OFFICE 2,565,852

THREADED FASTENER

Gilbert P. Ickes, Elyria, and Calvin D. Miller, Amherst, Ohio

Application August 24, 1950, Serial No. 181,228

2 Claims. (Cl. 85—9)

Our invention relates to threaded fasteners such as screws or bolts, and relates more particularly to such a fastener or device which is adapted for quick application for holding two or more parts together.

One of the objects of our invention is to produce a fastener of the above type from sheet metal by die forming the threads in a sheet metal blank and then forming the blank into a threaded cylindrical shank and a head portion.

Another object of the invention is to produce fasteners of the above mentioned type which are inexpensive to manufacture in large quantities, and which are light in weight while possessing great strength and resistance to torsional and compressive forces.

A further object of our invention resides in the provision of a fastener which is particularly useful in applications where the rapid fastening of two or more parts together is desired, such as where two sheets having aligned apertures are to be secured together by the application of a threaded fastener upon which a "speed nut" is to be applied.

Other objects and advantages of our invention will become more apparent as the following description of an embodiment thereof progresses, reference being made to the accompanying drawing in which like reference characters designate like parts throughout the same.

Figure 7:
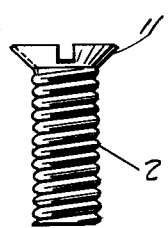
Figure 8:
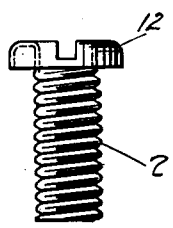
Figure 9:
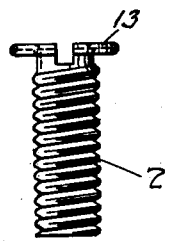

Figures 7, 8, and 9 respectively, illustrate fasteners made in accordance with our invention and illustrate several different types of heads which may be formed thereon.

Figure 1:
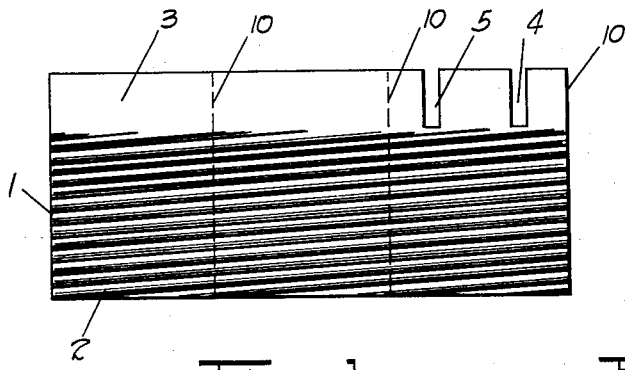
Figure 1 illustrates a multiple unit blank in sheet form, from which the fastener is made.

In carrying out our invention we preferably start with a strip 1 of sheet metal of desirable length and guage and of a predetermined width suitable to provide the ultimate longitudinal dimension of the fastener to be formed, as indicated in Figure 1. The blanks may be formed successively or continuously from a strip of sheet metal and after forming the threads the strip may be sheared into separate units or blanks at such points as for instance along the lines 10 as shown in Figure 1.

One method of making our fastener consists in feeding the strip 1 between fixed and reciprocating threading dies. When the strip is properly positioned therebetween, the reciprocating die is thrust downwardly against that portion of the blank overlying the fixed die to thereby impress and form in the flat blank a plurality of longitudinally disposed threads 2, so inclined to the longitudinal axis of the strip as to provide the ultimately desired pitch to the thread when the fastener is formed. It is also contemplated that the threads may be formed in the blank by feeding the blank between driven threading rolls. Still another method may consist of rolling a preformed, that is, a prethreaded blank, into cylindrical form forming the head of this fastener by any suitable means.

It will be noted that above the threaded portion 2 on the blank strip there is provided the unthreaded portion 3, from which the head of the fastener is finally formed. When it is desired to produce fasteners having slotted heads for receiving the end of a screw-driver or other driving tool, the slots 4 and 5, may be diecut into the blank downwardly from the upper edge of the unthreaded portion 3, to the threaded portion 2.

Figures 2, 3:
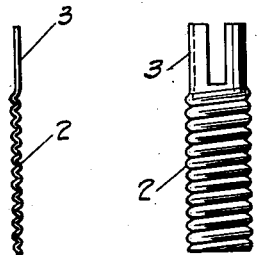
Figure 2 is an end view of the threaded blank shown in Figure 1.
Figure 3 illustrates the blank after it is rolled into cylindrical form.

Suitable means may be provided for shearing the die threaded strip transversely at selected intervals as indicated at 10 in Figure 1, so as to provide a number of flat fastener units having the proper dimension for forming the unit into a cylinder of the desired diameter. The several units may then be passed successively between forming dies to roll or form them into cylindrical shape as indicated in Figure 3.

The unthreaded upper portion 3, may be rolled or otherwise formed to provide a head 6 for the fasteners. In Figures 4, 7, 8, and 9, we have illustrated several different types of heads which may be formed integral with the shank of the fastener.

Figure 4:
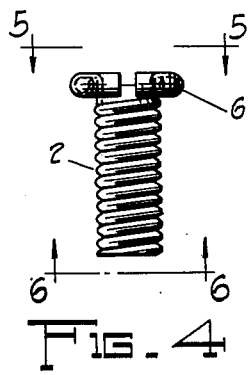
Figure 4 is a front elevation of a fastener made in accordance with our invention and formed from the blank shown in Figures 1, 2, and 3.
Figure 5:
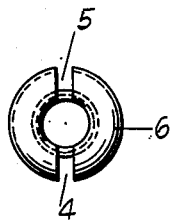
Figure 5 is a top plan view of the fastener.
Figure 6:
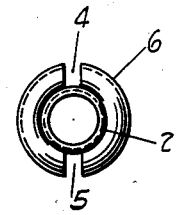
Figure 6 is a bottom end view of the same.

For instance, in Figure 4 the head 6 is rolled into a peripheral bead, while the head illustrated in Figure 7 is flared upwardly and outwardly of the shank as at 11. In Figures 8 and 9 we have illustrated two additional head forms which may be inverted U-shape as at 12 in Figure 8 or which may be folded and pressed upon itself as at 13 in Figure 9.

Fasteners made in accordance with this invention can be produced very rapidly and inexpensively and are strong and durable in use. We have found that fasteners of this construction are particularly useful in connection with the quick assembly of two or more parts together wherein speed fasteners are employed and in this connection our fasteners are especially desirable when used with devices known in the trade as "speed nuts."

We claim:

1. As a new article of manufacture a driven screw threaded fastener formed of sheet metal rolled into a hollow cylindrical shank, screw threads die formed in said shank and a head integral with said shank, said head having a rolled peripheral bead, said bead being separated transversely at opposed points to provide tool engaging slots in said head.

2. As a new article of manufacture a driven screw threaded fastener formed of sheet metal rolled into a hollow cylindrical shank, screw threads die formed in said shank and a head integral with said shank, said head having its peripheral portion formed upon itself annularly of the head and slotted at diametrically opposed points in the head periphery to provide tool engaging slots in said head.

GILBERT P. ICKES.
CALVIN D. MILLER.

REFERENCES CITED

The following references are of record in the file of this patent:

UNITED STATES PATENTS

| Number | Name | Date |
|---|---|---|
| 1,429,645 | Schroeder | Sept. 19, 1922 |
| 2,106,595 | Draving | Jan. 25, 1938 |